United States Patent [19]

Doty et al.

[11] Patent Number: 4,728,446

[45] Date of Patent: Mar. 1, 1988

[54] CORROSION INHIBITOR FOR BRINES

[75] Inventors: Peter A. Doty; William A. Larson, both of Midland, Mich.

[73] Assignee: The Dow Chemical Company, Midland, Mich.

[21] Appl. No.: 886,455

[22] Filed: Jul. 17, 1986

Related U.S. Application Data

[63] Continuation-in-part of Ser. No. 636,436, Jul. 31, 1984, abandoned.

[51] Int. Cl.$^4$ .................. E21B 43/00; C23F 11/18
[52] U.S. Cl. .................. 252/8.551; 252/8.51; 252/8.555; 252/387; 252/389.52
[58] Field of Search ............... 252/8.51, 8.514, 8.551, 252/8.555, 387, 389.52

[56] References Cited

U.S. PATENT DOCUMENTS

| | | |
|---|---|---|
| 1,844,999 | 2/1932 | White . |
| 2,073,413 | 3/1937 | Cross et al. . |
| 2,155,045 | 4/1939 | Griffith et al. . |
| 2,155,046 | 4/1939 | Griffith et al. . |
| 2,165,824 | 7/1939 | Vietti et al. . |
| 2,215,077 | 9/1940 | Beekhuis et al. . |
| 2,215,092 | 9/1940 | Beekhuis et al. . |
| 2,695,876 | 11/1954 | Farris ........................... 252/8.555 |
| 2,728,695 | 12/1955 | Harrison . |
| 2,784,788 | 3/1957 | Hughes et al. . |
| 2,980,620 | 4/1961 | Hatch . |
| 3,133,028 | 5/1964 | Channabasappa . |
| 3,151,087 | 9/1964 | Ryznar et al. . |
| 3,182,853 | 5/1965 | Willey . |
| 3,215,637 | 11/1965 | Clerbois ........................... 252/387 |
| 3,293,189 | 12/1966 | Morgenthaler . |
| 3,301,782 | 1/1967 | Knowles et al. . |
| 3,480,551 | 11/1969 | McCoy et al. . |
| 3,928,211 | 12/1975 | Browning et al. . |
| 4,100,100 | 7/1978 | Clous et al. . |
| 4,102,804 | 7/1978 | Clouse et al. . |
| 4,292,183 | 9/1981 | Sanders ........................... 252/8.551 |
| 4,304,677 | 12/1981 | Stauffer et al. ................... 252/8.551 |

FOREIGN PATENT DOCUMENTS 2027686 2/1980 United Kingdom .

OTHER PUBLICATIONS

Chemical Abstracts, vol. 68, 1968, p. 3169, Abstract No. 32471Z.

*Primary Examiner*—Herbert B. Guynn
*Attorney, Agent, or Firm*—Joe R. Prieto; Barbara J. Sutherland

[57] ABSTRACT

A corrosion inhibiting composition including a solution of at least one alkali or alkaline-earth metal halide in water and specific corrosion inhibiting concentrations of zinc ions and thiocyanate ions, for use in well drilling, completion, packer fluid and workover operations.

28 Claims, No Drawings

CORROSION INHIBITOR FOR BRINES

CROSS-REFERENCE TO RELATED APPLICATION

This application is a continuation-in-part of the copending application Ser. No. 636,436, filed July 31, 1984, now abandoned.

BACKGROUND OF THE INVENTION

This invention relates to corrosion inhibiting compositions and more particularly to corrosion inhibitors for use in brines.

Brines, for example, those referred to as "clear brine fluids," such as aqueous solutions of alkali or alkaline-earth metal halides including $CaCl_2$, $CaBr_2$, $MgCl_2$ and mixtures thereof, are used as drilling, completion, packer and workover fluids in oil and gas well operations. These brines are useful in providing a hydrostatic head, particularly in high-pressure wells which typically require fluids with densities of 8.5 pounds per gallon (ppg) or above. The choice of the specific salt employed in preparing the clear brine fluid depends on the required density for the particular end-use application. For example, brines having densities up to about 15 ppg are generally prepared from $CaCl_2$ or $CaBr_2$, whereas brines having a higher density, of above about 15 ppg, may be prepared using a mixture of, for example, a calcium halide and a significant percent of a zinc-based salt, generally more than about 5 percent by weight. Although lower density brines could be prepared using zinc salts, due to the relatively high costs of zinc salts these brines are most commonly prepared a calcium salt only. The use of these brines has improved well drilling, completion, packer and workover operations by eliminating formation plugging problems and solid settling problems previously encountered when solids-containing media, such as water base and oil base drilling muds, were used.

In spite of the improvements provided by the use of clear brine fluids, clear brine fluids can be corrosive under operating conditions in drilling, completion, packer and workover operations. The corrosion problem is exacerbated by the higher temperatures typically found in deeper wells in which these brines are used.

The prior art teaches that various corrosion inhibitors can be added to brines in an effort to overcome the corrosive nature of brines. Known inhibitors include, for example, film-forming amine-based corrosion inhibitors such as are described in U.S. Pat. No. 4,292,183.

Thiocyanate or thiourea compounds, used alone or in combination with quaternary pyridinium, quinolium or isoquinolinium salts, are known to be effective corrosion inhibitors for a number of aqueous brines of low and high densities, including those comprising calcium chloride, calcium bromide, calcium iodide, as well as various high density zinc-based brines. This is disclosed in British Pat. No. 2,027,686A.

However, while various effective corrosion inhibitors are known in the art, the present invention provides a brine composition showing improvements over the known art in achieving corrosion inhibiting properties that are both measurable and predeterminable, as well as a method of inducing corrosion inhibition of metals.

SUMMARY OF THE INVENTION

Accordingly, the present invention provides a composition comprising a solution of at least one alkali or alkaline-earth metal halide in water, this solution having corrosion inhibiting concentrations of zinc ions and thiocyanate ions, the zinc ion concentration independently lying in the range of from about 0.05 percent by weight to about 5.0 percent by weight, and the thiocyanate ion concentration independently lying in the range of from about 0.05 percent by weight to about 1.5 percent by weight.

Another aspect of the present invention is a method of inhibiting corrosion of metals comprising contacting a metal with a solution of at least one alkali or alkaline-earth metal halide in water and corrosion inhibiting concentrations of zinc ions and thiocyanate ions, the zinc ion concentration independently lying in the range of from about 0.05 percent by weight to about 5.0 percent by weight and the thiocyanate ion concentration independently lying in the range of from about 0.05 percent by weight to about 1.5 percent by weight.

DETAILED DESCRIPTION OF THE PREFERRED EMBODIMENT

As used herein, the term "inhibited brine" means a brine of an aqueous solution containing at least one inorganic salt of an alkali or alkaline-earth metal halide inhibited by zinc and thiocyanate ions. The brines intended to be covered in the present invention are aqueous solutions of halides of alkali or alkaline-earth metals and mixtures thereof. For example, the salts may include $CaCl_2$, $CaBr_2$, $MgCl_2$, $MgBr_2$ or mixtures thereof, and may also comprise zinc salts provided that the zinc ion concentration does not exceed about 5 percent by weight. In addition, other alkali metal halides such as NaCl, NaBr, KCl, KBr or mixtures thereof, and the like, or seawater may be useful in the present invention. Any aqueous solution of the aforementioned salts at any density is useful in the present invention. Preferably, brines of the present invention include brines having a density of about 8 ppg and above. More preferably, the density of the brine lies in the range from about 8 ppg to about 16 ppg. Even more preferably, the density of the brine may be in the range from about 10 ppg to about 15 ppg.

The brines used according to the present invention will be referred to herein as "clear brine fluids" which are suitable for use as well drilling, completion, packer and workover fluids in the oil and gas industry. The corrosion inhibiting composition of the present invention will be described herein with reference to clear brine fluids used in oil and gas wells. However, the present invention is not to be limited to such use, because the composition of the present invention can also be used in other applications, such as for the production of brines from subterranean formations or other applications where brine is used in contact with metal to inhibit the corrosive properties of the brine toward the metal. Metals which typically come into contact with the composition include ferrous metals and alloys of such metals, with steel being the most commonly and widely used in the oil and gas industry.

The corrosion inhibiting composition of the present invention consists essentially of brine (i.e., water and at least one alkali or alkaline-earth metal halide as described above) and corrosion inhibiting concentrations of zinc ions and thiocyanate ions. The concentration of the zinc ion independently lies in the range of about 0.05 percent by weight to about 5.0 percent by weight, and the concentration of the thiocyanate ion independently lies in the range of about 0.05 percent by weight to about 1.5 percent by weight. The corrosion inhibiting composition of the present invention includes corrosion inhibiting concentrations of any compound or combination of compounds which dissociate in an aqueous solution or in a brine of the present invention to provide zinc cations ($Zn^{++}$) and thiocyanate anions ($SCN^-$). Herein, the compound or combination of compounds which provide the $Zn^{++}$ and $SCN^-$ ions in solution will be referred to as a "corrosion inhibitor."

For example, zinc thiocyanate ($Zn(SCN)_2$) is a preferred corrosion inhibitor compound since it provides both $Zn^{++}$ and $SCN^-$ ions when it is in solution. In addition, mixtures of zinc compounds and thiocyanate compounds or thiourea compounds may be used as the corrosion inhibitor to provide the $Zn^{++}$ and $SCN^-$ ions in a brine or other aqueous solution. For example, the zinc compounds, which may be water-soluble or brine-soluble, may include halides of zinc, such as zinc bromide ($ZnBr_2$) or zinc chloride ($ZnCl_2$) and mixtures thereof. Other zinc compounds, such as zinc formate, zinc hydroxide or zinc acetate may be utilized, which ionize in a brine or aqueous solution to produce zinc ions. The preferred zinc compound, when used in combination with a separate thiocyanate compound, is a zinc halide such as $ZnCl_2$ or $ZnBr_2$. While it is preferred that the zinc and thiocyanate ions be added to a brine which initially contains neither ion, in order to facilitate accurate and controlled determination of the ion concentrations, it is also possible to begin with a brine or other aqueous solution which already contains a concentration of zinc ions up to the maximum limit of about 5.0 percent by weight, and/or thiocyanate ions up to the maximum limit of about 1.5 percent by weight. Thus, any addition of the ion-contributing compounds must be correspondingly limited in view of any already present ion concentrations. However, the addition of thiocyanate ions to zinc-based brines per se, in which zinc is generally present at much greater concentrations than the ranges contemplated herein, is not within the scope of this invention.

The thiocyanate compounds useful in the present invention are of the type represented by the general formula:

X-SCN where X is any inorganic or organic cation.

The preferred thiocyanate compounds used are those which are water-soluble or brine-soluble or which incorporate at least the thiocyanate ion in solution. For example, the thiocyanate compounds used may be thiocyanic acid and the inorganic salts of thiocyanic acid, particularly the alkali metal or alkaline-earth metal thiocyanates, namely, sodium, potassium, lithium, calcium and magnesium thiocyanates as well as ammonium thiocyanates. Other thiocyanate compounds which ionize in a brine solution or aqueous solution to produce thiocyanate ions can be utilized. Particularly preferred is ammonium thiocyanate. Mixtures of two or more of such thiocyanate compounds can also be employed.

The thiourea compounds useful in the present invention, for example, may be of the type represented by the formula

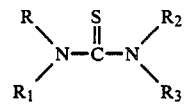

where R, $R_1$, $R_2$ and $R_3$ are each selected from the group consisting of hydrogen, and alkyl radicals containing from 1 to 4 carbon atoms such as methyl, ethyl, propyl, isopropyl, butyl and isobutyl.

Of the thiourea compounds, it is particularly preferred to utilize thiourea. Again, it will be understood that mixtures of two or more of said thiourea compounds can be employed, as well as mixtures of the thiocyanate and thiourea compounds. Furthermore, the combination of zinc compounds and thiocyanate compounds or thiourea compounds used should be compatible.

Other known additives which will not significantly impair the corrosion inhibitor's effectiveness may be added to the composition of the present invention. For example, in oil well applications, viscosifiers such as hydroxyethylcellulose; flocculants such as polyacrylamide; fluid loss agents such as calcium carbonate; pH control chemicals such as lime; and other drilling aids such as lubricants, oils, emulsifiers, and $H_2S$ scavengers may be included in the composition.

In preparing a corrosion inhibiting composition of the present invention, the zinc and thiocyanate ion-contributing compound or compounds may be dissolved in the brine either directly or after dissolving the compounds in a solvent such as water. The resulting inhibited brine is then ready for use. For example, the inhibited brine may be used in drilling, completion, packer and workover applications.

Effective concentrations of ion-contributing compounds are added to the brine to produce a decreased amount of corrosion of metal in contact with the brine as compared with that which would be produced by an uninhibited brine of the same composition. The preferable quantities of ion-contributing compounds added will vary depending to some extent on the application conditions and the degree of corrosion protection desired, and the natural corrosivity of the uninhibited brine. It should be noted that wide variance in the corrosivity of uninhibited brines will be encountered, as illustrated in the examples below. While zinc ion concentrations lying within the range of from about 0.05 percent by weight to about 5.0 percent by weight are comprehended by the present invention, it is preferred to use a narrower range, from about 0.05 percent to about 1.5 percent, and more preferably from about 0.5 percent to about 1.5 percent by weight. The preferred thiocyanate ion concentration independently lies from about 0.5 percent to about 1.5 percent also.

If a combination of a zinc compound and a thiocyanate compound is employed as the corrosion inhibitor, the quantity of each compound used should be sufficient to provide a concentration of $Zn^{++}$ and $SCN^-$ ions substantially equivalent to that which would be provided by the compound of $Zn(SCN)_2$, alone, as described above. For example, if a combination of $NH_4SCN$ and $ZnBr_2$ is used as the inhibitor, 0.084 percent by weight of $NH_4SCN$ and 0.124 percent by weight $ZnBr_2$ would be required in the brine to achieve the equivalent of 0.1 percent by weight $Zn(SCN)_2$ in the brine. Furthermore, a specific molar concentration ratio of $Zn^{++}$ to $SCN^-$ can vary within applicable limits and still accomplish the purpose of the present invention.

The inhibited brine composition may be used at various temperatures and pressures. For example, if the inhibited brine is employed as well drilling, completion or workover fluid in oil and gas wells to reduce corrosion of metal in contact with the fluid, typically, the temperature of the fluid in use ranges from about 100° F. (37.8° C.) to about 500° F. (260° C.). The composition of the present invention is especially useful at temperatures ranging from about 150° F. (65.5° C.) to about 400° F. (204.4° C.).

The following general corrosion test procedure was used to demonstrate experimentally the effectiveness of the corrosion inhibiting composition of the present invention.

GENERAL CORROSION TEST PROCEDURE

A series of test solutions of uninhibited brine is vigorously mixed at 75° F.±5° F. (23.9° C.±2.8° C.) with a corrosion inhibitor.

Coupons of N-80 steel are prepared by sonicating in acetone (coupons are stored with an oil coating) and then rinsing with clean acetone. The coupons are dried and then weighed.

The corrosion test on the coupons is done in a stainless steel aging cell lined with a quartz container using the test solutions. The coupons are placed in each of the solutions. With the test solution and coupons in place, the cell is sealed and nitrogen ($N_2$) padded using a 150 psig $N_2$ pressure.

Once the aging cell has been heated to the predetermined test temperature, the test period begins while the temperature is maintained. The heater is then turned off and the aging cell allowed to cool to a temperature from about 80° F. (26.7° C.) to about 100° F. (37.8° C.). The aging cell is then vented and opened. The coupons are transferred to an inhibited 10 percent HCl solution and cleaned ultrasonically for 2 minutes. The coupons are then rinsed with water and subsequently with acetone. The coupons are weighed after drying. The rate of corrosion of each sample is calculated using the following equations:

$$\text{Corrosion rate in mils/year } (mpy) = \frac{A \times \text{weight loss (g)}}{\text{Test length (days)}}$$

wherein A is a constant for a given coupon surface area.

The percent protection is calculated using the following equation:

$$\text{Percent Protection} = \frac{(CB - CTC) \times 100}{CB}$$

wherein CB=corrosion rate of blanks and CTC=corrosion rate of test coupons.

The examples which follows are given to illustrate the invention and should not be construed as limiting its scope. All parts and percentages are by weight unless otherwise indicated.

EXAMPLE 1

The general corrosion test procedure above was used to corrosion test N-80 steel coupons with dimensions of 3/16 inch by 1 inch by 1/16 inch and an exposed surface area of about 0.5 square inch. The test solutions used were a series of 15 milliliter (ml) test solutions of $CaCl_2$ brine having a density of 11.6 ppg (1.39 g/cm$^3$, 38 percent $CaCl_2$ and 62 percent water) mixed with a corrosion inhibiting ion source and their respective amounts as described in column (a) of Table I below.

The aging cell was heated to a test temperature of 400° F. (204° C.) for 7 days. The rate of corrosion of each sample was calculated using the following equation:

$$\text{Corrosion rate in mils/year } (mpy) = \frac{5672 \times \text{weight loss (g)}}{\text{Test length (days)}}$$

The results, described in Table I below, show that the $Zn(SCN)_2$ inhibitor gives a lower corrosion rate than other thiocyanate compounds with equivalent molar concentrations of thiocyanate ions. The concentrations of the corrosion inhibiting ion sources (called "inhibitors") have been adjusted to ensure molar equivalence of the inhibiting ions, since this is a more accurate comparison than simple weight percent equivalence. In addition, Table I shows that the $Zn(SCN)_2$ inhibitor gives an improved corrosion rate over a known film-forming amine inhibitor.

TABLE I

| Sample | (a) Inhibitor | Corrosion Rate (mpy) | Percent Protrction |
|---|---|---|---|
| Comparative Sample A | none | 5.0 | — |
| Comparative Sample B | 0.1% NH$_4$SCN | 11.7 | 0* |
| Comparative Sample C | 0.105% NaSCN | 11.8 | 0* |
| Comparative Sample D | 0.10% KI-86[1] | 3.0 | 40 |
| Sample 1 | 0.119% Zn(SCN)$_2$ | 1.2 | 76 |

*These systems accelerated corrosion over that of the base brine.
[1]KI-86 is a film-forming amine inhibitor which is commercially available from The Tretolite Company, a division of Petrolite Corp.

EXAMPLE 2

The general corrosion test procedure above was used for testing coupons with dimensions of 1 9/16 inch by 1 inch by 3/16 inch with a ¼ inch diameter hole and an exposed surface of about 4 square inches. The test solutions used were a series of 150 ml solutions of 15.0 ppg (1.8 g/cm$^3$) $CaCl_2$ and $CaBr_2$ brine mixture (43.6 percent $CaBr_2$, 17.1 percent $CaCl_2$ and 56.3 percent water) mixed with corrosion inhibitors and their respective amounts as described in column (a) of Table II below. The aging cell was heated at 300° F. (149° C.) for 5 days and 21 hours. The rate of corrosion of each sample was calculated using the following equation:

$$\text{Corrosion rate in mils/year } (mpy) = \frac{709 \times \text{weight loss (g)}}{\text{Test length (days)}}$$

Table II describes the synergistic effect of adding zinc ions to a thiocyanate-containing system. Again, molar equivalence rather than weight percent equivalence has been applied. The inhibitor comprising a combination of a thiocyanate compound and zinc ions gives a lower corrosion rate than the thiocyanate compound alone.

TABLE II

| Sample | (a) Inhibitor | Corrision Rate (mpy) | Percent Protection |
|---|---|---|---|
| Comparative Sample A | none | 15.2 | — |
| Comparative | 0.10% NaSCN | 8.4 | 44.7 |

TABLE II-continued

| Sample | (a) Inhibitor | Corrision Rate (mpy) | Percent Protection |
|---|---|---|---|
| Sample B | | | |
| Sample 1 | 0.10% NaSCN + 0.01% Zn++ | 7.2 | 52.6 |
| Sample 2 | 0.10% NaSCN + 0.025% Zn++ | 2.3 | 84.9 | each sample was calculated using the following equation:

$$\text{Corrosion rate in mils/year } (mpy) = \frac{1242 \times \text{weight loss (g)}}{\text{Test length (days)}}$$

For this test concentrations of the inhibitors were equivalent in terms of weight percent.

TABLE IV

| | 0.10 Percent Concentration | | 0.5 Percent Concentration | | 2.0 Percent Concentration | |
|---|---|---|---|---|---|---|
| Inhibitor | Corrosion Rate, mpy | Percent Protection | Corrosion Rate, mpy | Percent Protection | Corrosion Rate, mpy | Percent Protection |
| 1. Uninhibited | 34.8[1] | — | 34.8[1] | — | 34.8[1] | — |
| 2. ZnCl$_2$ | 54.0 | 0* | 40.3 | 0* | 19.4 | 44.3 |
| 3. ZnCl$_2$ + NH$_4$SCN[2] | 5.2 | 85 | 0.7 | 98 | 2.0 | 94.3 |
| 4. ZnCl$_2$ + NH$_4$SCN[3] | 4.0 | 89 | 0.7 | 98 | 6.1 | 82.5 |
| 5. Zn(SCN)$_2$ | 2.5 | 93 | 1.6 | 95 | 13.4 | 61.5 |
| 6. ZnCrO$_4$[4] | 59.5 | 0* | 21.7 | 38 | 13.7 | 60.6 |
| 7. NaSCN | 24.5 | 30 | 18.5 | 47 | 20.7 | 40.5 |
| 8. NH$_4$SCN | 52.0 | 0* | 19.8 | 43 | 20.3 | 41.7 |

*Accelerates corroision
Notes:
[1] Average of five duplicates
[2] [ZnCl$_2$ + NH$_4$SCN] total is concentration shown (50:50)
[3] [ZnCl$_2$] and [NH$_4$SCN] each are concentration shown
[4] ZnCrO$_4$ is essentially insoluble at concentrations shown

EXAMPLE 3

The general corrosion test procedure above was used for corrosion testing coupons with dimensions at 1 9/16 inch by 1 inch by 3/16 inch with a ¼ inch diameter hole and an exposed surface area of about 4 square inches. The test solutions used were a series of 150 ml solutions of CaCl$_2$ brine (38 percent CaCl$_2$ and 62 percent H$_2$O) having a density of 11.6 ppg (1.39 g/cm$^3$). The corrosion inhibitor used was Zn(SCN)$_2$ and the amounts used are described in column (a) of Table III below. The aging cell was heated at 400° F. (204° C.) for 10 days and 17 hours. The rate of corrosion of each sample was calculated using the following equation:

$$\text{Corrosion rate in mils/year } (mpy) = \frac{709 \times \text{weight loss (g)}}{\text{Test length (days)}}$$

The results shown in Table III illustrate the effectiveness of a Zn(SCN)$_2$ inhibitor as a function of concentration.

TABLE III

| Sample | (a) Inhibitor | Corrosion Rate (mpy) | Percent Protection |
|---|---|---|---|
| Comparative Sample A | none | 8.5 | — |
| Sample 1 | 0.01% Zn(SCN)$_2$ | 8.4 | 1.2 |
| Sample 2 | 0.05% Zn(SCN)$_2$ | 3.3 | 61.2 |
| Sample 3 | 0.10% Zn(SCN)$_2$ | 0.2 | 97.6 |

EXAMPLE 4

Again, using the general corrosion test procedure of the previous examples, N-80 steel coupons measuring 1½ inch by ½ inch by 3/16 inch and an exposed surface area of about 2.1 square inches were tested. The test solution was a series of 42 ml solutions of uninhibited CaCl$_2$ brine having a density of 11.65 ppg mixed with a corrosion inhibitor in the respective amounts shown in Table IV.

The aging cell was heated to a test temperature of 400° F. (204° C.) for 7 days. The rate of corrosion for As seen in Table IV, the present invention, which is exemplified by Inhibitor Nos. 3, 4 and 5, exhibited substantially increased corrosive inhibition at the 0.10 percent and 0.5 percent concentrations when compared with inhibitors consisting of zinc chloride, zinc chromate, sodium thiocyanate or ammonium thiocyanate used alone. Furthermore, an unexpected synergism in using either zinc chloride together with ammonium thiocyanate, or zinc thiocyanate per se, as ion-contributing sources is illustrated when compared with the anticipated corrosion inhibition produced by their combination as calculated from the inhibition achieved by each when used alone. Thus, it is clear that the combination of zinc and thiocyanate is unique when compared with the combination of thiocyanate and other non-zinc cations, such as sodium and ammonium.

What is claimed is:

1. A composition for inhibiting corrosion of ferrous metals and alloys thereof comprising a solution of at least one alkali or alkaline-earth metal halide in water, said solution having a density equal to or less than about 16 pounds per gallon and further having corrosion inhibiting concentrations of zinc ions and thiocyanate ions, the total zinc ion concentration of said solution independently lying in the range of from about 0.05 percent by weight to about 5.0 percent by weight, and said thiocyanate ion concentration independently lying in the range of from about 0.05 percent by weight to about 1.5 percent by weight.

2. The composition of claim 1 wherein the solution has a density of from about 8 pounds per gallon to about 16 pounds per gallon.

3. The composition of claim 1 wherein the metal halide is CaCl$_2$, CaBr$_2$, MgCl$_2$, MgBr$_2$, NaCl, NaBr, KCl, KBr or mixtures thereof.

4. The composition of claim 3 wherein the metal halide is CaCl$_2$.

5. The composition of claim 1 wherein the zinc and thiocyanate ions are provided by zinc thiocyanate.

6. The composition of claim 1 wherein the zinc ions and thiocyanate ions are provided by a zinc compound and a thiocyanate compound.

7. The composition of claim 6 wherein the zinc compound is a zinc halide.

8. The composition of claim 6 wherein the thiocyanate compound is ammonium thiocyanate.

9. The composition of claim 1 wherein said zinc ion and thiocyanate ion concentrations independently lie in the range of about 0.05 percent by weight to about 1.5 percent by weight.

10. A method of inhibiting corrosion of ferrous metals and alloys thereof comprising contacting a ferrous metal or alloy thereof with a solution of at least one alkali or alkaline-earth metal halide in water, said solution having a density equal to or less than about 16 pounds per gallon and further having corrosion inhibiting concentrations of zinc ions and thiocyanate ions, the total zinc ion concentration of said solution independently lying in the range of from about 0.05 percent by weight to about 5.0 percent by weight, and said thiocyanate ion concentration independently lying in the range of from about 0.05 percent by weight to about 1.5 percent by weight.

11. The method of claim 10 wherein said metal halide is $CaCl_2$, $CaBr_2$, $MgCl_2$, $MgBr_2$, NaCl, NaBr, KCl, KBr or mixtures thereof.

12. The method of claim 11 wherein said metal halide is $CaCl_2$.

13. The method of claim 10 wherein said zinc ions and said thiocyanate ions are provided by zinc thiocyanate.

14. The method of claim 10 wherein said zinc ions and said thiocyanate ions are provided by a zinc compound and a thiocyanate compound.

15. The method of claim 14 wherein said zinc compound is a zinc halide.

16. The method of claim 14 wherein said thiocyanate compound is ammonium thiocyanate.

17. The method of claim 10 wherein at least a portion of the metal is at least at a temperature of about 100° F. (37.8° C.).

18. The method of claim 10 wherein said zinc ion and thiocyanate ion concentrations independently lie in the range of from about 0.05 percent by weight to about 1.5 percent by weight.

19. A method of inhibiting corrosion of ferrous metals and alloys thereof comprising contacting a ferrous metal or alloy thereof with an inhibiting solution, said inhibiting solution being prepared by adding zinc ions and thiocyanate ions to a substantially zinc-free brine solution of at least one alkali or alkaline-earth metal halide in water, said solution having a density of less than or equal to about 16 pounds per gallon, such that the total zinc ion concentration lies in the range of from about 0.05 percent by weight to about 5.0 percent by weight, and the total thiocyanate ion concentration lies in the range of from about 0.05 percent by weight to about 1.5 percent by weight.

20. The method of claim 19 wherein said substantially zinc-free brine solution comprises less than about 0.05 percent by weight of zinc.

21. The method of claim 19 wherein said metal halide is $CaCl_2$, $CaBr_2$, $MgCl_2$, $MgBr_2$, NaCl, NaBr, KCl, KBr or mixtures thereof.

22. The method of claim 21 wherein said metal halide is $CaCl_2$.

23. The method of claim 19 wherien said zinc ions and said thiocyanate ions are provided by zinc thiocyanate.

24. The method of claim 19 wherein said zinc ions and said thiocyanate ions are provided by a zinc compound and a thiocyanate compound.

25. The method of claim 24 wherein said zinc compound is a zinc halide.

26. The method of claim 24 wherein said thiocyanate compound is ammonium thiocyanate.

27. The method of claim 19 wherein at least a portion of the metal is at least at a temperature of about 100° F. (37.8° C.).

28. The method of claim 19 werein said zinc ion and thiocyanate ion concentrations independently lie in the range of from about 0.05 percent by weight to about 1.5 percent by weight.

* * * * *

UNITED STATES PATENT AND TRADEMARK OFFICE
CERTIFICATE OF CORRECTION

PATENT NO. : 4,728,446

DATED : March 1, 1988

INVENTOR(S) : Peter A. Doty and William A. Larson

It is certified that error appears in the above-identified patent and that said Letters Patent is hereby corrected as shown below:

Column 1, line 35 please delete "prepared a" and insert -- prepared using a --.

Column 5, line 56 please delete "follows" and insert -- follow --.

Column 6, line 25 please delete "Protrction" and insert -- Protection --.

Column 6, line 64 please delete "Corrision" and insert -- Corrosion --.

Column 7, line 2 please delete "Corrision" and insert -- Corrosion --.

Column 7-8, first line in bottom margin of Table IV please delete "*Accelerates Corroision" and insert -- *Accelerates Corrosion --.

Signed and Sealed this

Twenty-fifth Day of October, 1988

Attest:

DONALD J. QUIGG

Attesting Officer

Commissioner of Patents and Trademarks